Jan. 23, 1968     U. SKIPPER     3,364,993
METHOD OF WELL CASING REPAIR
Original Filed June 26, 1964     2 Sheets—Sheet 1
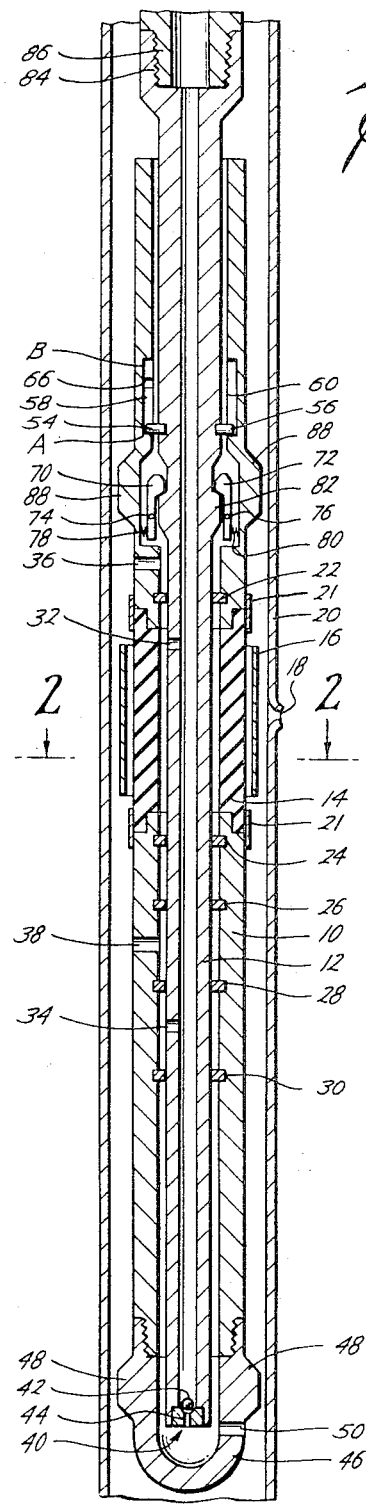
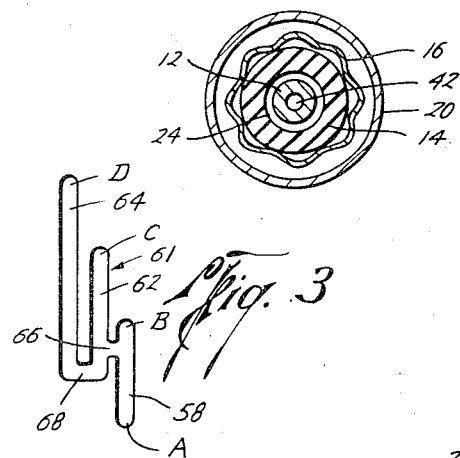
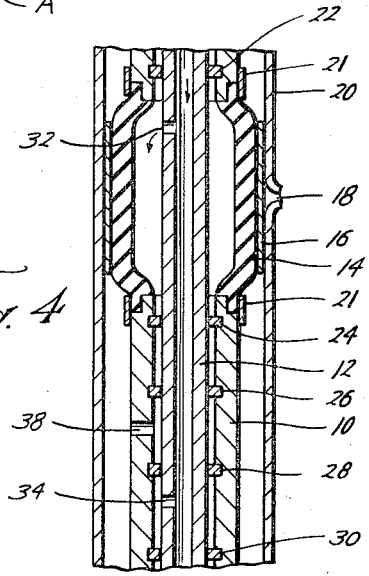
Uvon Skipper
INVENTOR.
BY Arnold, Roylance,
Kruger & Durkee
ATTORNEYS

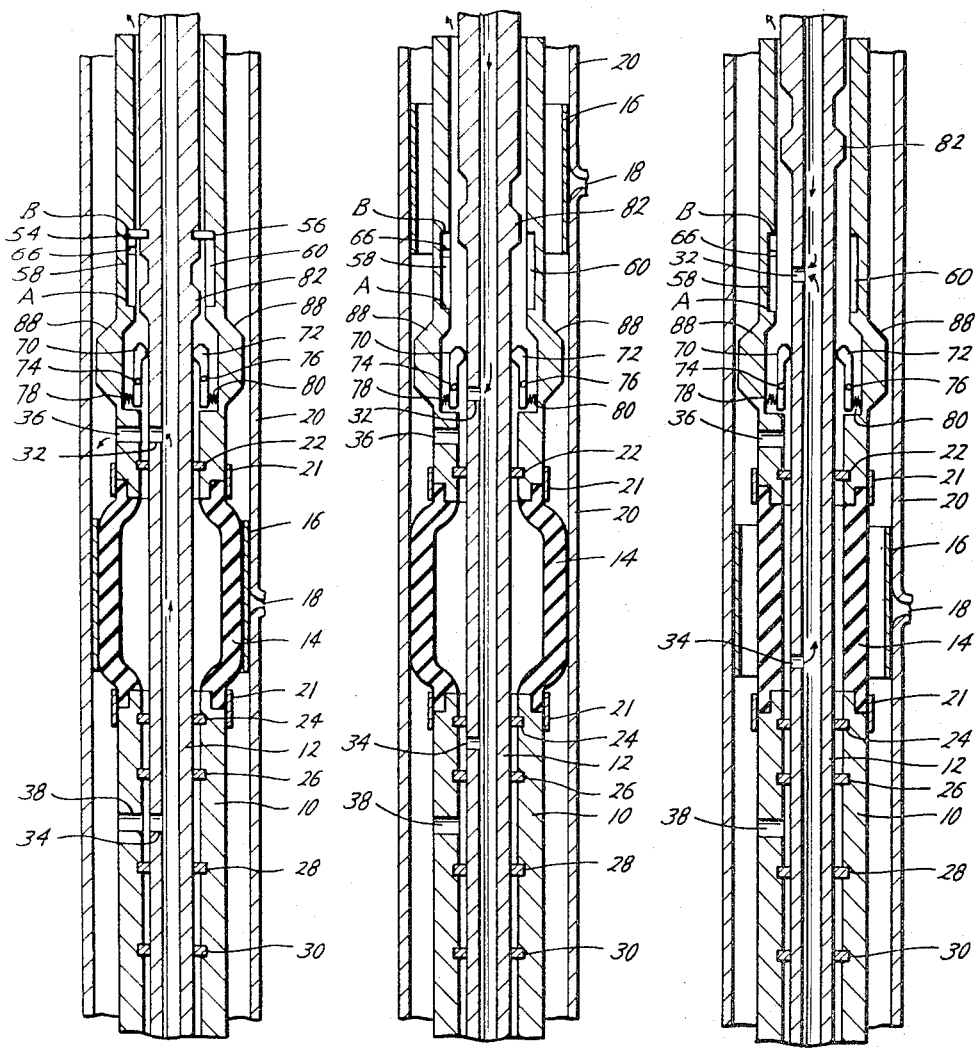

United States Patent Office 3,364,993
Patented Jan. 23, 1968

3,364,993
METHOD OF WELL CASING REPAIR
Uvon Skipper, Houston, Tex., assignor to Wilson Supply Company, Houston, Tex., a corporation of Texas
Original application June 26, 1964, Ser. No. 378,841, now Patent No. 3,326,293, dated June 20, 1967. Divided and this application Apr. 18, 1967, Ser. No. 631,710
7 Claims. (Cl. 166—4)

ABSTRACT OF THE DISCLOSURE

A method of well casing repair wherein a radially expansible resilient portion of a tool is located adjacent the hole in the casing and thereafter the expansible resilient portion is inflated by fluid pressure to expand and set over the hole a corrugated steel liner having an adhering and setting resin on its outer face. The method can include sealing and pressurizing the casing to locate leakage, and can provide impressions of the casing damage to determine size and configuration. Repair and a quality check of the repair can be accomplished during the same trip into the casing by expanding and setting a patch over the casing damage, and then moving the tool and sealing and pressurizing the casing in the area of the patch.

This application is a division of application Ser. No. 378,841, filed June 26, 1964, and entitled, "Well Casing Repair," now issued as U.S. Patent No. 3,326,293.

Background of the invention

The invention concerns a tool suitable for insertion into a casing, such as a well casing, for locating and/or repairing certain types of damage in the casing, and a method by which a casing can be patched and the quality of the patch can be tested without withdrawal from the casing.

Well casings, underground pipes, and pressure vessels in general sometimes develop holes, ruptures, or other discontinuities which need to be repaired. The holes or ruptures can result from a number of causes, such as corrosion, unusual stresses, abrasive action, operation of equipment within the vessel, intentional fracturing, and the like, and the damaged area is usually not readily accessible, rendering repair difficult.

A number of tools for locating the damaged area and for repairing the damaged area have been proposed. For example, to locate the damaged area, one may employ an electromagnetic inspection tool, a tool having mechanical fingers for locating damage, a tool which obtains an impression of the damaged area in wax, rubber, or the like, or a tool which permits pressurization of the casing in successive portions to determine at what point leakage occurs.

In general, after the damage is located, repair is effected by setting a liner in the casing over the damaged area. The liner is ordinarily radially expansible to permit both insertion in the casing and setting against the inner wall of the casing, and can comprise such expansible materials as ductile metal or plastics, glass fabrics impregnated with a setting resin, or brittle materials such as steel when the brittle materials are corrugated or otherwise shaped to permit expansion. A liner comprising corrugated steel covered with glass fabric and a setting resin has been found to be particularly effective for repairing damage when the liner must withstand high pressures and stresses, such as in well casings. Tools for setting a liner generally comprise, depending on the type of liner, of course, either a means for longitudinally compressing at least a portion of the liner to expand the liner radially and set it against the casing, resilient means for radially expanding against the liner to expand and set the liner, or a solid cone-shaped expander which is drawn through the liner to expand it radially.

Summary of the invention

The invention provides a novel tool which can be employed not only to set a radially expansible liner in a casing or other object but also to locate a damaged area in a casing or other object, and which can exhibit a variety of desirable characteristics as will be pointed out hereinafter. The invention also provides a novel method which can reduce the amount of the work involved in repairing a damaged area in a casing or other object.

In general, a tool exemplifying one embodiment of the invention, which is suitable for insertion into an object and then expansion against or toward its interior by fluid pressure, comprises an outer sleeve having a radially expansible resilient portion between its ends, an inner sleeve slidable in the outer sleeve to two positions, and transverse conduit means and sealing means associated with the inner and outer sleeves in a number and in places sufficient for permitting in one of the two positions fluid from within the inner sleeve to flow through a conduit means to the interior or inside of the resilient portion and expand this portion, and for permitting in the other of the two positions fluid near or against the resilient portion to flow back into the inner sleeve to deflate the resilient portion and fluid in the inner sleeve to flow therefrom to the outside of the tool. The transverse conduit means and sealing means together constitute what in general may be referred to simply as conduit means for permitting the above fluid flows in the two positions.

Thus, when the tool is attached to a string of pipe and then inserted into a casing, the resilient portion of the tool can be expanded or inflated by injection of fluid under pressure through the string of pipe into the inner sleeve, and deflation can be accomplished by adjusting by manipulation of the string of pipe the relative position of the inner and outer sleeve, whereby fluid near the resilient portion and in the inner sleeve can flow to the outside of the tool. In the latter position, fluid in the string of pipe and in the inner sleeve can be displaced out into the casing, thereby keeping fluid away from an operator of the tool at the open end of the casing as the tool and string of pipe are withdrawn.

The above tool can be easily modified to gain a number of additional characteristics which are desirable especially with respect to the repair of casings in oil or gas wells. For example, sufficient conduit means and sealing means may be added to permit pressurization of the casing at one end of the tool by fluid flowing out of the inner sleeve when the resilient portion is expanded, thereby permitting a determination of leakage through the casing above or below the tool. Conduit means and sealing means may also be located to permit equalization of pressures in the casing above and below the tool when the resilient portion of the tool is expanded. This characteristics is desirable, for example, when the flow and pressure of oil or gas within a casing are strong enough to interfere with the setting of a liner in the casing.

In general, the method of the invention for patching a hole in a casing and then testing the quality of the patch comprises placing an expansible patch or liner around a radially expansible resilient portion of a tool having means for permitting fluid pressure to expand the resilient portion, attaching the tool to a pipe string and inserting the tool in the casing to a place where the patch is substantially centered over the hole, and then injecting fluid into the tool to inflate the resilient portion and thereby expand and set the patch against the casing over the hole. After the patch is set, the method comprises decreasing the fluid pressure on the resilient portion to deflate this portion, moving the tool to a position away from but near the patch, such as, for example, immediately below the patch in a well casing, injecting fluid into the tool to inflate the resilient portion against the casing wall, injecting fluid into the section of casing containing the patch, and determining whether leakage occurs. The patching operation can then be completed by decreasing the fluid pressure on the resilient portion of the tool to deflate this portion and then withdrawing the tool from the casing. Thus, in accordance with this method, a casing can be patched and the quality of the patch can be tested during the same trip into the casing.

*Brief description of the drawings*

In the drawings:

FIGURE 1 is a sectional view of a tool in accordance with the invention positioned in a well casing with a liner disposed adjacent a damaged area of the casing;

FIGURE 2 is a sectional view taken along the line 2—2 in FIGURE 1;

FIGURE 3 is a schematic illustration of a guide slot employed in the embodiment of the invention shown in FIGURE 1;

FIGURE 4 is a sectional view of the central portion of the tool of FIGURE 1 illustrating one operating position of the tool;

FIGURE 5 is a sectional view illustrating more of the portion of the tool of FIGURE 1 in a second operating position;

FIGURE 6 is a sectional view of a central portion of the tool of FIGURE 1 illustrating a third operating position of the tool.

FIGURE 7 is a sectional view of a central portion of the tool of FIGURE 1 illustrating a fourth operating position of the tool.

For purposes of clarity, the presence of fluid is not illustrated in the drawings, although its flow is indicated.

*Description of the preferred embodiments*

The invention will be better understood by reference to the drawing wherein FIGURE 1 is a vertical sectional view illustrating a preferred embodiment of a tool in accordance with the invention. The tool there shown comprises an outer sleeve 10 and an inner sleeve 12 slidable in the outer sleeve 10. The sleeve 10 has a radially expansible resilient portion 14 between its ends around which is disposed a liner 16 for patching a discontinuity such as a hole 18 in a well casing 20. The outer sleeve 10 comprises two nonexpansible sections and a section of a resilient material, the resilient portion 14, mounted hermetically between and with two nonexpansible sections. The resilient material may be any suitable material, such as natural or synthetic rubber, neoprene, and the like, and can be reinforced, if necessary, with cord, braided wire, or other material to withstand the pressure required to complete the patching operation. Further, the resilient portion 14 may comprise a plurality of layers of resilient material with a reinforcing material such as wire between adjacent layers. The resilient material may be connected to the nonexpansible sections in any suitable manner, such as with bonding agents, mechanical means such as metal bands 21, or a combination of the two. The inner sleeve 12 and the nonexpansible sections of the outer sleeve 10 are preferably made of steel, but obviously may be constructed of other suitable materials.

Near the ends of the resilient portion 14 and between the inner sleeve 12 and the outer sleeve 10 are sealing or packing means 22 and 24, such as an O-ring or other annular packing member of, for example, neoprene, natural or synthetic rubber, or other suitable packing material. Sealing means 26, 28, and 30 which can be similar in construction to the sealing means 22 and 24 are spaced in order below the sealing means 24 and between the inner sleeve 12 and the outer sleeve 10. All of the sealing means can be held in place by retaining grooves in the inside wall of the outer sleeve 10 as shown, or by other suitable retaining means.

A pair of transverse ports or apertures 32 and 34 are longitudinally spaced in the inner sleeve 12, and a pair of transverse ports or apertures 36 and 38 in the outer sleeve 10 are spaced longitudinally about the same distance apart as the ports 32 and 34. At the bottom end of the inner sleeve 12 is a means 40 for closing this end when the inner sleeve 12 contains fluid under pressure, which means may be a permanently closed portion of the inner sleeve 12, but which preferably is a check valve comprising a ball 42 resting on a seat 44. A check valve at this point permits fluid in the casing 20 to enter into the inner sleeve 12 and then flow out the top of the tool as the tool is lowered in the casing 20 when it is full of fluid, thereby permitting easy descent of entry into the casing 20.

Connected to the bottom end of the outer sleeve 10 is preferably a plug 46 which protects the remaining portions of the tool from injury during entry into the casing 20 and which has centralizing means 48 to help center the tool in the casing 20. The centralizing means 48 preferably comprises a plurality of fins having frangible portions which will break if the tool sticks in the casing 20, such as when the liner 16 is only partially expanded but yet firmly fixed against the casing 20. The centralized means 48 may be located on the outer sleeve 10, but is preferably located on an easily replaceable part, such as the plug 46, in case of breakage. An aperture 50 is preferably provided in the plug 46 to permit fluid in the casing 20 to reach the means 40 for closing the inner sleeve 12 during descent of the tool.

As better shown in FIGURE 2, the liner 16 is preferably a corrugated steel tube which is expansible to set against the casing 20, particularly when the liner 16 must withstand high pressures and stresses. The outside surface of the liner 16 is preferably coated with glass fabric and a setting resin to help effect a good seal with the casing 20, and the outside surface of the liner 16 preferably has a perimeter equal to or slightly greater than the internal circumference of the casing 20 to ensure a tight fit.

The preferred tool also comprises a means for positioning or locating the inner sleeve 12 relative to the outer sleeve 10. Such means may take the form of a pin or member extending from one of the sleeves 10 and 12 and slidable in one or more slots in the wall of the other of the sleeves 10 and 12 or possibly take the form of a worm-and-rack arrangement. The means preferably comprises a pair of pins 54 and 56 which protrude from sleeve 12 and are slidably disposed in opposed slots 58 and 60 in the interior wall of the outer sleeve 10. The pins 54 and 56 can be an integral part of the inner sleeve 12, although separate pins permit easier assembly of the tool.

As shown schematically in FIGURE 3, the slots 58 and 60 preferably form a part of identical slot tracks, only one of which, track 61, is illustrated in FIGURE 3. The slot tracks may assume a variety of configurations depending on the number of relative positions between the inner sleeve 12 and the outer sleeve 10 which may be desired. The slot track 61 as shown preferably comprises the slot 58 disposed longitudinally, a second longitudinal slot 62, a third longitudinal slot 64, and two interconnecting slots 66 and 68, slot 66 being shown in FIGURE 1. Thus, the slot track 61 has four positions A, B, C, and D to which the pin 54 can slide, and the inner sleeve 12 can assume corresponding positions A, B, C and D relative to the outer sleeve 10. The slot 60 in FIGURE 1 is associated with an identical but oppositely disposed slot track.

Detents 70 and 72 pivotally mounted on the outer sleeve 10 by pins 74 and 76 are spring-biased against the inner sleeve 12 by tension springs 78 and 80, and engage a collet or shoulder 82 on the inner sleeve 12 to keep the pins 54 and 56 and the inner sleeve 12 in position A until detents 70 and 72 are forcibly disengaged. Obviously, only one detent is required to accomplish the intended purpose, but one or more pairs of detents are preferred to maintain alignment of the sleeves 10 and 12. The detents 70 and 72 and the collet 82 are preferably shaped to require more force to disengage them than to engage them.

At the top end of the inner sleeve 12 is a means 84 for attaching the inner sleeve 12 to a pipe 86, preferably threads mateable with threads on the pipe 86. Also near the top end of the tool may be located a centralizing means 88 which can be constructed much the same as the centralizing means 48 near the bottom of the tool.

FIGURE 1 illustrates the tool with the inner sleeve 12 positioned with respect to the outer sleeve 10 when pins 54 and 56 are in position A. This is the relative position normally maintained while the tool descends in the casing 20 and the liner 16 is centered over the hole 18. In this position the detents 70 and 72 are engaged with the collet 82 and keep the outside sleeve 10 from changing position with respect to the inner sleeve 12. When the tool is located properly in the casing 20, fluid under pressure, preferably water or a drilling mud, is injected into the open end of pipe 86 or its extension from which it flows into inner sleeve 12, closing the check valve at the bottom end of the inner sleeve 12 and flowing into the interior of the resilient portion 14 through port 32. As particularly illustrated in FIGURE 4, wherein arrows represent the direction of flow, the resilient portion 14 consequently expands out towards the casing 20 and sets the liner 16 against the casing 20. Flow through the port 34 is prevented or checked during this period by the pair of sealing means 28 and 30.

If pressures in the casing 20 above and below the expanded resilient portion 14 need to be equalized at this time, the inner sleeve 12 is moved relative to the outer sleeve 10 to position B, as shown in FIGURE 5, by raising the pipe 86 or its extension the required distance and forcibly overriding the action of the detents 70 and 72 against the collet 82. The outer sleeve 10 does not move because of friction between the expanded resilient portion 14, the liner 16, and the casing 20. In this position, the port 32 passes above the sealing means 22 and communicates with the aperture 36 in the outer sleeve 10 as well as any space open to the outside of the tool between the inner sleeve 12 and the outer sleeve 10, and the port 34 falls between the sealing means 26 and 28 and communicates with the aperture 38 in the outer sleeve 10. Thus, the resilient portion 14 remains expanded, and pressures in the casing 20 above and below the resilient portion 14 can equalize by flow in either direction along the path indicated by the arrows.

When the liner 16 is permanently set in the casing 20 and the effectiveness of the liner 16 is to be tested, the pipe 86 is lowered causing the inner sleeve 12 to return to position A and to be latched in this position by detents 70 and 72 and collet 82, the position shown in FIGURE 1. The pressure of the fluid in the pipe 86 and the inner sleeve 12 is then decreased to deflate the resilient portion 14, and the tool without the liner 16 is moved to a position in the casing 20 below the liner 16, as shown in FIGURE 6, where the resilient portion 14 is again inflated according to the procedures described in the discussion about position A shown in FIGURES 1 and 4. The inner sleeve 12 is then moved to position C relative to outer sleeve 10 by raising the pipe 86 and overriding the detents 70 and 72, rotating the pipe 86 to move the pin 54 through the interconnecting slot 66 and the pin 56 through its corresponding slot, and then raising the pipe 86 until the pins 54 and 56 and the inner sleeve 12 are in position C. In this position, as shown in FIGURE 6 wherein the arrows indicate the direction of fluid flow, the port 34 is between a pair of sealing means 24 and 26 and thus blocked, and the port 32 is in a position where fluid introduced into the inner sleeve 12 by way of the pipe 86 will flow out of the tool through aperture 36 and the open space between the upper ends of the inner sleeve 12 and the outer sleeve 10, and pressurize the section of the casing 20 containing the liner 16 as a patch, thereby allowing a determination of any leakage past the liner 16.

To remove the tool from the casing 20 while emptying the fluid contents of the pipe 86 and the inner sleeve 12, the pins 54 and 56 are manipulated through their corresponding slot tracks to position D by manipulation of the pipe 86 while the resilient portion 14 is expanded. As shown in FIGURE 7, in position D the port 34 communicates with the interior of the resilient portion 14 and the port 32 communicates with the outside of the tool through the aperture 36 and the open space between the inner sleeve 12 and the outer sleeve 10. As shown by the arrows in FIGURE 7, fluid adjacent the resilient portion flows into the inner sleeve 12 to deflate the resilient portion 14, and fluid in the inner sleeve 12, including fluid entering the inner sleeve 12 from the pipe 86 as the tool is raised, flows to the outside of the tool.

Thus, a preferred embodiment of the tool of the invention permits one to patch a casing and test the quality of the patch during the same trip into the casing. The tool also is capable of emptying its fluid contents to its outside during removal of the tool from the casing, thereby avoiding troublesome conditions near the operator removing the tool from the casing.

The tool can also be employed in accordance with the above procedures to get an impression of a damaged area in a casing by having an impressionable material on the outside of the resilient portion, and then expanding the resilient portion against the damaged area. A sleeve of cured rubber with an outside covering of uncured rubber strapped over the resilient portion is particularly suitable to obtain an impression. Wax, metal foil, or similar material coated over the resilient portion can also be employed if conditions are such that the impressionable material will not be washed or dissolved from the resilient portion.

A damaged area in a casing can be located with a tool in accordance with the invention by inflating the tool at successive places in the casing, pressurizing the casing at one end of the tool at each of the places, and determining between which places leakage occurs by detecting pressure drop in the casing. For example, by inflating the resilient portion at intervals of one hundred feet and pressurizing the casing above the tool at each place, it can be determined within which interval a leak exists. By then pressurizing and testing the casing at different places along this interval the leak can be located with sufficient accuracy to permit patching. Of course, different size intervals may be chosen for testing as suits the operator of the tool.

I claim:

1. A method for patching a hole in the wall of a casing and testing the quality of the patch during the same trip into the casing, which method comprises placing an expansible patch around a radially expansible resilient portion of a tool having means therein for permitting fluid pressure to expand said resilient portion;

attaching said tool to a pipe string and inserting said tool in said casing to a place where said expansible patch is substantially centered over said hole;

injecting fluid into said tool to inflate said resilient portion and thereby to expand and set said patch against said casing over said hole;

decreasing fluid pressure on said resilient portion to deflate said portion;

moving said tool to a position away from but near said patch;

injecting fluid into said tool to inflate said resilient portion against the wall of said casing;

injecting fluid into the section of said casing containing said patch and determining whether leakage occurs;

decreasing fluid pressure on said resilient portion to deflate said portion; and withdrawing said tool from said casing.

2. The method described in claim 1, wherein casing fluid is passed through said tool into said pipe string during insertion of the tool into the casing to decrease resistance to the passage of said tool and to equalize the pressure within said tool with the pressure of said casing fluid.

3. The method described in claim 1, wherein said fluid injected into said tool is drained into said casing during withdrawal of said tool from said casing.

4. The method described in claim 1, wherein during the setting of said patch the fluid pressure in the casing immediately below said patch is maintained substantially equal with the fluid pressure in the casing immediately above said patch.

5. The method described in claim 1, wherein:
casing fluid is passed through said tool into said pipe string during insertion of the tool into the casing to decrease resistance to the passage of said tool and to equalize the pressure within said tool with the pressure of said casing fluid;
during the setting of said patch the fluid pressure in the casing immediately below said patch is maintained substantially equal with the fluid pressure in the casing immediately above said patch; and
said fluid injected into said tool is drained into said casing during withdrawal of said tool from said casing.

6. A method for repairing a hole in the wall of a casing comprising
placing an impressionable material around a radially expansible resilient portion of a tool having means therein for permitting fluid pressure to expand said resilient portion;
attaching said tool to a pipe string and inserting said tool in said casing to a place where said impressionable material is substantially centered over said hole;
injecting fluid into said tool to inflate said resilient portion and thereby expand said impressionable material against said hole to make an image of said hole on said material;
decreasing fluid pressure on said resilient portion to deflate said portion and withdrawing said tool from said casing;
subsequently placing an expansible patch around a radially expansible resilient portion of a tool having means therein for permitting fluid pressure to expand said resilient portion;
attaching said tool to a pipe string and inserting said tool in said casing to a place where said expansible patch is substantially centered over said hole;
injecting fluid into said tool to inflate said resilient portion and thereby to expand and set said patch against said casing over said hole;
decreasing fluid pressure on said resilient portion to deflate said portion;
moving said tool to a position away from but near said patch;
injecting fluid into said tool to inflate said resilient portion against the wall of said casing;
injecting fluid into the section of said casing containing said patch to pressurize said casing section and to determine whether leakage occurs;
decreasing fluid pressure on said resilient portion to deflate said portion; and
withdrawing said tool from said casing.

7. A method for repairing a hole in the wall of a casing comprising
attaching to a pipe string a tool having a radially expansible resilient portion and a means therein for permitting fluid pressure to expand said resilient portion;
inserting said tool in said casing to a predetermined location;
injecting fluid into said tool to inflate said resilient portion and thereby expand said portion into sealing contact with the walls of said casing;
injecting fluid into the sealed section of said casing to pressurize said casing section and to determine whether leakage occurs within said pressurized section;
decreasing fluid pressure on said resilient portion to deflate said portion;
moving said tool to another predetermined location and repeating the inflation of said resilient portion of said tool and the pressurization of said casing section to determine whether leakage occurs;
repeating the steps of inflation of said resilient portion of said tool and pressurization of the casing section until leakage is located;
decreasing fluid pressure on said resilient portion to deflate said portion and withdrawing said tool from said casing;
subsequently placing an impressionable material around a radially expansible resilient portion of a tool having means therein for permitting fluid pressure to expand said resilient portion;
attaching said tool to a pipe string and inserting said tool in said casing to a place where said impressionable material is substantially centered over said hole;
injecting fluid into said tool to inflate said resilient portion and thereby expand said impressionable material against said hole to make an image of said hole on said mtaerial;
decreasing fluid pressure on said resilient portion to deflate said portion and withdrawing said tool from said casing;
subsequently placing an expansible patch around a radially expansible resilient portion of a tool having means therein for permitting fluid pressure to expand said resilient portion;
attaching said tool to a pipe string and inserting said tool in said casing to a place where said expansible patch is substantially centered over said hole;
injecting fluid into said tool to inflate said resilient portion and thereby to expand and set said patch against said casing over said hole;
decreasing fluid pressure on said resilient portion to deflate said portion;
moving said tool to a position away from but near said patch;
injecting fluid into said tool to inflate said resilient portion against the wall of said casing;
injecting fluid into the section of said casing containing said patch to pressurize said casing section and to determine whether leakage occurs;
decreasing fluid pressure on said resilient portion to deflate said portion; and
withdrawing said tool from said casing.

References Cited
UNITED STATES PATENTS

| | | | |
|---|---|---|---|
| 1,880,218 | 10/1932 | Simmons | 166—207 X |
| 2,164,195 | 6/1939 | Waltermire | 73—40.5 |
| 2,583,316 | 1/1952 | Bannister | 166—207 X |
| 3,047,065 | 7/1952 | Vincent | 166—14 |
| 3,111,991 | 11/1963 | O'Neal | 166—207 |
| 3,194,310 | 7/1965 | Loomis | 166—14 X |
| 3,297,092 | 1/1967 | Jennings | 166—207 |

CHARLES E. O'CONNELL, *Primary Examiner.*

DAVID H. BROWN, *Examiner.*